(12) United States Patent
Pfefferkorn

(10) Patent No.: US 11,738,528 B2
(45) Date of Patent: Aug. 29, 2023

(54) METHOD FOR POST-TREATING AND A POST-TREATMENT SYSTEM

(71) Applicant: EOS GmbH Electro Optical Systems, Krailling (DE)

(72) Inventor: Florian Pfefferkorn, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 368 days.

(21) Appl. No.: 16/475,594

(22) PCT Filed: Dec. 8, 2017

(86) PCT No.: PCT/EP2017/081990
§ 371 (c)(1),
(2) Date: Jul. 2, 2019

(87) PCT Pub. No.: WO2018/133991
PCT Pub. Date: Jul. 26, 2018

(65) Prior Publication Data
US 2021/0129425 A1 May 6, 2021

(30) Foreign Application Priority Data
Jan. 18, 2017 (DE) .......... 102017200773.7

(51) Int. Cl.
*B29C 71/00* (2006.01)
*B29C 64/153* (2017.01)
(Continued)

(52) U.S. Cl.
CPC .......... *B29C 71/0009* (2013.01); *B22F 10/28* (2021.01); *B22F 10/68* (2021.01);
(Continued)

(58) Field of Classification Search
CPC ... B29C 64/153; B29C 64/35; B29C 71/0009; B29C 2071/0027; B29C 2071/0045;
(Continued)

(56) References Cited

U.S. PATENT DOCUMENTS 5,482,659 A * 1/1996 Sauerhoefer .......... B33Y 40/00
264/401
5,775,402 A 7/1998 Sachs et al.
(Continued)

FOREIGN PATENT DOCUMENTS

DE 69333169 5/2004
DE 60303275 10/2006
(Continued)

*Primary Examiner* — Xiao S Zhao
*Assistant Examiner* — John J DeRusso
(74) *Attorney, Agent, or Firm* — Seyfarth Shaw LLP

(57) ABSTRACT

A method for post-treating a three-dimensional object produced by selectively solidifying, layer by layer, of a building material in powder form and/or post-treating unsolidified building material in which the three-dimensional object is embedded. The three-dimensional object and/or the unsolidified building material may be treated with a liquid. The liquid may comprises a liquid carrier substance and at least one further substance that reduces surface tension of the carrier substance.

19 Claims, 3 Drawing Sheets

(51) Int. Cl.
  *B33Y 40/20*   (2020.01)
  *B29C 64/35*   (2017.01)
  *B29C 71/02*   (2006.01)
  *B29C 35/16*   (2006.01)
  *B22F 10/28*   (2021.01)
  *B22F 10/68*   (2021.01)
  *B22F 10/00*   (2021.01)
  *B22F 10/73*   (2021.01)
  *B22F 12/13*   (2021.01)
  *B22F 12/41*   (2021.01)

(52) U.S. Cl.
  CPC ............ *B29C 35/16* (2013.01); *B29C 64/153* (2017.08); *B29C 64/35* (2017.08); *B29C 71/02* (2013.01); *B33Y 40/20* (2020.01); *B22F 10/00* (2021.01); *B22F 10/73* (2021.01); *B22F 12/13* (2021.01); *B22F 12/41* (2021.01); *B22F 2999/00* (2013.01); *B29C 2035/1616* (2013.01); *B29C 2035/1625* (2013.01); *B29C 2071/0027* (2013.01); *B29C 2071/0045* (2013.01); *B29C 2071/025* (2013.01)

(58) Field of Classification Search
  CPC ... B29C 71/02; B29C 2071/025; B29C 35/16; B29C 2035/1616; B29C 2035/1625; B33Y 40/20

See application file for complete search history.

(56) References Cited

U.S. PATENT DOCUMENTS

| | | | |
|---|---|---|---|
| 6,245,281 B1* | 6/2001 | Scholten | C08G 69/14 |
| | | | 264/497 |
| 7,468,405 B2 | 12/2008 | Allen et al. | |
| 2007/0241482 A1 | 10/2007 | Giller et al. | |
| 2009/0291308 A1 | 11/2009 | Pfister et al. | |
| 2010/0155985 A1 | 6/2010 | McAlea et al. | |
| 2012/0177696 A1 | 7/2012 | Wang et al. | |
| 2014/0283936 A1 | 9/2014 | Dandaleix | |
| 2017/0057163 A1* | 3/2017 | Chaplin | B29C 64/357 |
| 2018/0178241 A1* | 6/2018 | Luo | B29C 71/0009 |
| 2019/0176404 A1* | 6/2019 | Schoeneborn | B29C 64/153 |

FOREIGN PATENT DOCUMENTS

| | | |
|---|---|---|
| DE | 102009047237 | 8/2011 |
| WO | 9412284 | 6/1994 |
| WO | 2009141047 | 11/2009 |

* cited by examiner

METHOD FOR POST-TREATING AND A POST-TREATMENT SYSTEM

TECHNICAL FIELD OF THE INVENTION

The invention relates to a method for post-treating a three-dimensional object produced by selectively solidifying, layer by layer, of a building material in powder form and/or unsolidified building material in which the three-dimensional object is embedded, as well as to a corresponding post-treatment system.

BACKGROUND OF THE INVENTION

Methods and devices for producing a three-dimensional object by selectively solidifying, layer by layer, of a building material in powder form are used, for example, in rapid prototyping or additive manufacturing. An example of such a method is known as "selective laser sintering" or "selective laser melting". Another example of such a method is known as "multi-jet fusion". In these methods, a thin layer of a building material in powder form is applied repeatedly and the building material is selectively solidified in each layer by selective irradiation of locations that correspond to a cross-section of the object to be produced by means of a laser.

SUMMARY OF THE INVENTION

Document WO 2009/141047 A1 describes a method for producing a three-dimensional object by selectively solidifying a material in powder form at the locations corresponding to the cross-section of the object in the respective layer by the action of electromagnetic radiation. The powder is a plastic powder. After the object has been produced, unsolidified powder is treated with water or water vapor and then reused for building a new object.

After the three-dimensional object has been produced, the three-dimensional object and the unsolidified building material in which the three-dimensional object is embedded are post-treated in order to cool the three-dimensional object and the unsolidified building material.

US 2010/0155985 A1 proposes to pass a cooling fluid, for example nitrogen, through the powder cake comprising the object produced in order to cool the object.

It is an object of the present invention to provide an alternative and/or improved method or an alternative and/or improved system for post-treating a three-dimensional object produced by selectively solidifying, layer by layer, of a building material in powder form and/or unsolidified building material in which the three-dimensional object is embedded.

This object is solved by a method according to claim 1 and a post-treatment system according to claim 14. The post-treatment system according to the invention can also be further developed by features of the method according to the invention, which features are given further below in the description or in the dependent claims. Vice versa, the method according to the invention can also be further developed by features of the post-treatment system according to the invention, which features are given further below in the description.

The method according to the invention serves for post-treating of a three-dimensional object produced by selectively solidifying, layer-by-layer, of a building material in powder form and/or of unsolidified building material in which the three-dimensional object is embedded, wherein the three-dimensional object produced and/or the unsolidified building material are treated with a liquid. The liquid comprises a liquid carrier substance and at least one further substance which reduces the surface tension of the carrier substance. By using such a liquid, the liquid can migrate into the unsolidified building material, in other words, the liquid can better penetrate the unsolidified building material and thus effect cooling on a larger effective area. This can, for example, accelerate cooling of the three-dimensional object and/or of the unsolidified building material.

The invention also makes it possible, for example, to reduce or stop the degradation (ageing) of the material of the three-dimensional object produced and/or of the unsolidified building material, and thus, the quality of the three-dimensional object produced and/or the reusability of the unsolidified building material can be improved.

Furthermore, the invention also makes it possible, for example, to improve the quality of the three-dimensional object produced, such as its dimensional accuracy and constancy of shape. In particular, irregular shrinkage and/or deformations that occur during cooling slowly, e.g. due to an inhomogeneous temperature distribution in the cooling object, can be partially or completely avoided.

Furthermore, the invention also makes it possible, for example, to at least partially freeze the state of the three-dimensional object and/or of the unsolidified building material, which state exists before post-treating, i.e. to subject the three-dimensional object and/or the unsolidified building material to quenching. Quenching is to be understood as a quick or sudden cooling or chilling of an object or part and/or material.

Preferably, the further substance is volatile, in particular more volatile than the carrier substance. This can, for example, facilitate evaporation of the liquid after treatment of the three-dimensional object produced and/or the unsolidified building material.

For example, the further substance contains a substance selected from the group consisting of acyclic aliphatic hydrocarbons and cyclic aliphatic hydrocarbons, which can be alkanes, alkenes, alkynes, respectively, and aromatic hydrocarbons, halogenated hydrocarbons, alcohols, ketones, aldehydes, carboxylic acids, ethers and esters.

Preferably, the further substance is an alcohol, preferably an acyclic alcohol, more preferably an acyclic alcohol with a molecular formula $C_nH_{2n+2}O$, wherein n=1, 2, 3 or 4, even more preferably ethanol. According to the inventors' experiments, for example, the cooling rate, the reusability of the unsolidified building material and/or the quality of the three-dimensional object produced can thus be influenced particularly favorably.

Preferably, the concentration of the further substance in the liquid is at least 0.1 percent by weight, preferably at least 0.5 percent by weight, more preferably at least 1 percent by weight, even more preferably at least 2.5 percent by weight, most preferably at least 5 percent by weight and/or 45 percent by weight at most, preferably 35 percent by weight at most, more preferably 25 percent by weight at most, even more preferably 15 percent by weight at most, most preferably 10 percent by weight at most. With such concentrations, for example, implementation can take place without further safety measures such as special explosion-proof devices. According to the inventors' experiments, with such concentrations it is possible, for example, to achieve the advantageous effects of the inventive method described above in a particularly pronounced way.

Preferably, the carrier substance contains water, wherein preferably the concentration of the water in the fluid is at least 65 percent by weight, more preferably at least 75 percent by weight, even more preferably at least 85 percent by weight, most preferably at least 90 percent by weight and/or wherein preferably the concentration of the water in the liquid is 99.5 percent by weight at most, more preferably 99 percent by weight at most, even more preferably 97.5 percent by weight at most, most preferably 95 percent by weight at most. By choosing this carrier substance and such a concentration, the costs for the liquid can be kept low, for example, and the positive effects of the inventive method described above can be realized in a particularly pronounced way.

Preferably, the building material in powder form comprises at least one of the polymers from the group consisting of polyetherimides, polycarbonates, polyphenylene sulfones, polyphenylene oxides, polyethersulfones, acrylonitrile-butadiene-styrene copolymers, polyacrylates, polyesters, polyamides, polyaryletherketones, polyethers, polyurethanes, polyimides, polyamide-imides, polyolefins and copolymers comprising at least two different monomer units of the aforementioned polymers and/or at least one polyblend based on at least two of the aforementioned polymers and copolymers, wherein the building material in powder form preferably comprises a polyamide, wherein the building material in powder form more preferably comprises a polyamide 12 (PA12). When such a building material is used, for example, the advantageous effects of the inventive method may be particularly pronounced, in particular the halt of degradation of the material of the three-dimensional object and/or of the unsolidified building material.

Preferably, the further substance is a substance that has been used in the preparation of the building material in powder form. This can, for example, prevent the unsolidified building material from being contaminated by the inventive method.

Preferably, before post-treatment, the liquid has a temperature lower than the temperature of the three-dimensional object produced. This allows the three-dimensional object to be cooled by treatment with the liquid.

Preferably, the method is carried out in such a way that, after post-treatment, at least part of the unsolidified building material has a temperature which is below the glass transition temperature of a polymer contained in the building material. This can, for example, minimize the aging effect of the powder.

Preferably, the method is carried out in such a way that, after post-treatment, the three-dimensional object produced and/or the unsolidified building material has a temperature which substantially corresponds to the room temperature. This makes it possible, for example, to immediately subject the three-dimensional object or the unsolidified building material to post-processing and/or post-treatment.

Preferably, the entire three-dimensional object produced, i.e. including its interior, is cooled to a temperature below the glass transition temperature of a polymer contained in the building material. By means of this, for example, deformations of the three-dimensional object ("warpage") that occur during cooling can be minimized or completely prevented.

Preferably, the treatment with the liquid is carried out by at least partially immersing the three-dimensional object and/or the unsolidified building material in the liquid. In this way, for example, rapid intimate contact can be established between the liquid and the three-dimensional object or the unsolidified building material, including penetration of the object or the unsolidified building material with the liquid. Treatment with the liquid can also be carried out by pouring the liquid over the three-dimensional object and/or the unsolidified building material. Preferably, by doing so, the three-dimensional object and/or the unsolidified building material is placed in or above a container, for example a tub. In this way, the liquid can be collected and e.g. gathered for subsequent treatment and/or reuse.

In particular, when the three-dimensional object and/or the unsolidified building material is immersed, preferably a force is exerted on the three-dimensional object and/or the unsolidified building material, which force is opposed to the buoyancy force acting on the three-dimensional object and/or the unsolidified building material. In this way, it is possible, for example, to immerse in the liquid a three-dimensional object and/or unsolidified building material having a specific weight less than the specific weight of the liquid.

Preferably, the unsolidified building material, in particular unsolidified building material located in channels and/or cavities of the three-dimensional object, is detached from the three-dimensional object, wherein the three-dimensional object and/or the unsolidified building material are treated with ultrasound and/or infrasound and/or with at least one jet, in particular with at least one jet of the liquid, and/or wherein at least the liquid is set in motion, in particular shaken and/or stirred and/or swiveled. In this way, for example, the three-dimensional object produced and the unsolidified building material can be completely and particularly effectively dissociated (separated) from each other.

Preferably, at least a part of the unsolidified building material and/or of the three-dimensional object is dried, wherein drying is preferably implemented by evaporation or volatilization of the liquid and/or by means of a centrifuge and/or by means of a gas flow and/or by means of a heating. Drying can also be accelerated by further means such as the use of drying agents such as silica gel, zeolites and/or sodium sulfate. Other suitable drying agents are familiar to the person skilled in the art. A dried three-dimensional object or dried unsolidified building material can, for example, be directly transferred to further processing or further machining.

Preferably, post-treatment is implemented by at least two post-treatment steps carried out one after the other, wherein at least one post-treatment step is implemented by means of a further liquid. By treating the three-dimensional object and/or the unsolidified building material with different liquids, the advantageous effects of the inventive method, which effects are described above, can be enhanced and/or several of these effects can be combined, for example.

For example, the further liquid can be a mixture of several substances, in particular a solution, for example a solution of water and ethanol, or a mono-constituent substance such as water.

Preferably, post-treatment is implemented by at least two post-treatment steps carried out one after the other, wherein at least one post-treatment step comprises waiting for a predetermined resting term. By waiting for a predetermined resting time, preferably as the first post-treatment step after the layer-wise selective solidification, it is possible, for example, to cool the three-dimensional object produced to a temperature starting from which, in the course of subsequent treatment with a liquid, it can be cooled in such a way that cracks and/or deformations do not form in the three-dimensional object.

Preferably, post-treatment is implemented by at least two post-treatment steps carried out one after the other, such that after the first post-treatment step, at least a part of the unsolidified building material has a temperature which is below the glass transition temperature of a polymer contained in the building material. This way, for example, aging effects of the unsolidified building material can be minimized or avoided completely. For example, a liquid used in a subsequent treatment step can differ in its composition and/or its temperature from the liquid used in the first post-treatment step.

Preferably, the building material used to produce the three-dimensional object contains at least a proportion of recycled powder having previously remained as unsolidified building material in the production of a three-dimensional object. The proportion of recycled powder is preferably at least 20 percent by weight, more preferably at least 40 percent by weight, even more preferably at least 60 percent by weight, particularly preferred at least 80 percent by weight. By using recycled powder, for example, the consumption of building material can be reduced in an economically and ecologically sensible way.

Preferably, the liquid is at least partially regenerated after the post-treatment, in particular cleared from unsolidified building material by means of sedimentation and/or filtration. This can, for example, reduce the consumption of the carrier liquid and/or the consumption of the at least one further substance in an economically and ecologically advantageous way.

The post-treatment system according to the invention for post-treating a three-dimensional object produced by selectively solidifying, layer by layer, a building material in powder form and/or unsolidified building material in which the three-dimensional object is embedded, comprises at least one post-treatment device in which the three-dimensional object produced and/or the unsolidified building material are treated with a liquid during operation and a provisioning assembly for providing the liquid such that it comprises a liquid carrier substance and at least one further substance that reduces the surface tension of the carrier substance.

The respective post-treatment device preferably comprises a post-treatment container for receiving the three-dimensional object and/or the unsolidified building material and for supplying liquid, wherein the post-treatment container is preferably at least temporarily permeable to the liquid, further preferably has regions at least temporarily permeable to the liquid which regions are located near its bottom. By means of such a device, for example, a device is provided with which the method according to the invention can be implemented.

The respective provisioning assembly for providing the liquid can comprise a mixing device (such as a mixing faucet in which the liquid carrier substance and the at least one further substance are fed from two separate conduits into a common conduit and mix in the common conduit and/or an intermediate mixing container into which the liquid carrier substance and the at least one further substance are introduced for mixing and are mixed therein) or can comprise a single container (e.g. a tank) in which the liquid carrier substance and the at least one further substance are already present in a mixed state and can therefore be provided directly at any time. Furthermore, the provisioning assembly preferably comprises a supply line for the liquid to the post-treatment device.

With the aid of the inventive post-treatment system, the method according to the invention can be implemented in an uncomplicated and controlled manner, wherein basically both a premade liquid mixture (i.e. the liquid in the sense of the invention—also in the following) and a liquid mixture prepared by the post-treatment system itself can be provided.

The surface tension of a liquid is measured according to DIN 55660. Typical values for the surface tension of various liquids at a temperature of 20° C. are given in table 1.

TABLE 1

| substance | surface tension (N/m) |
| --- | --- |
| water | 0.0728 |
| benzene | 0.0289 |
| glycerol | 0.0634 |
| glycol | 0.0477 |
| methanol | 0.0226 |
| ethanol | 0.02255 |
| acetone | 0.02330 |
| benzene | 0.0289 |
| ethylene glycol | 0.0484 |
| n-pentane | 0.0160 |
| n-hexane | 0.0184 |
| $H_2SO_4$ (98.5%) | 0.0551 |

In the context of the invention, a volatile, i.e. rapidly evaporating, substance is understood to be a substance with a low evaporation number VD, in particular with a VD<80. The evaporation number is measured according to DIN 53170.

A first substance is more volatile than a second substance if the first substance has a lower evaporation number than the second substance.

The terms "substance" and "carrier substance" each can be used to denote both a mono-constituent substance, e.g. a chemical compound, and a mixture of substances, e.g. a solution.

BRIEF DESCRIPTION OF THE DRAWINGS

Features and expediencies of the invention are set out in the description of exemplary embodiments with the aid of the attached drawings.

DETAILED DESCRIPTION OF THE EMBODIMENTS

Hereafter, several embodiments of the present invention are described with reference to the figures.

Figure 1:
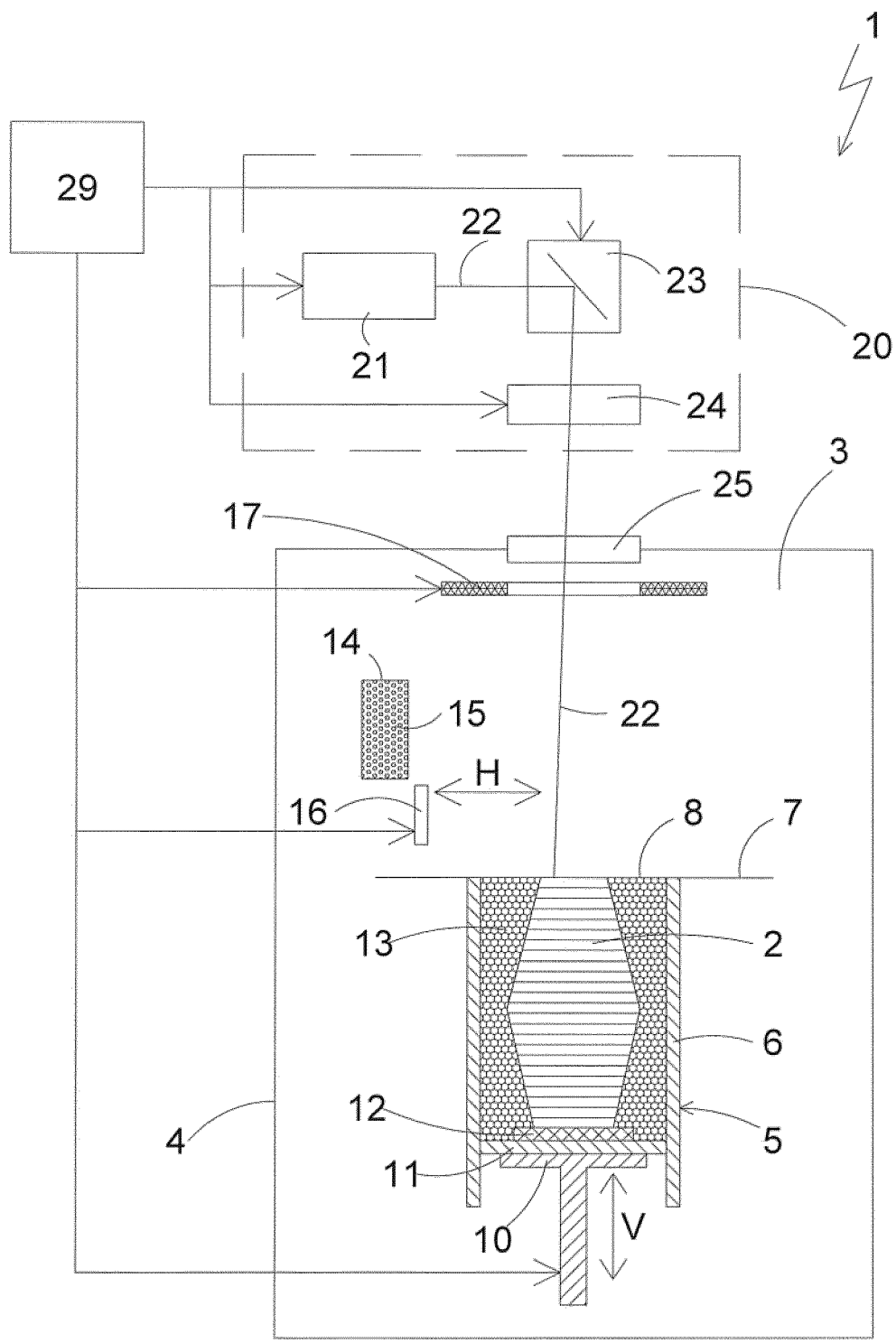
FIG. 1 shows a schematic view, partially in cross-section, of a device for producing a three-dimensional object by means of selectively solidifying, layer by layer, a building material in powder form.

The device shown in FIG. 1 according to an exemplary embodiment is a laser sintering or laser melting device 1. For building an object 2, it comprises a processing chamber 3 with a chamber wall 4.

A building container 5 open to the top with a container wall 6 is arranged in the processing chamber 3. A working plane 7 is defined by the upper opening of the building container 5, wherein the area of the working plane 7 located within the opening, which can be used for building the object 2, is referred to as build area 8.

In the building container 5, a support 10 is arranged that can be moved in a vertical direction V and to which a base plate 11 is attached which seals the building container 5 at the bottom and thus forms the bottom thereof. The base plate 11 can be formed as a plate separately from the support 10 which plate is fixed to the support 10, or it can be integrally formed with the support 10. Depending on the building material and process used, a building platform 12 can also be arranged on the base plate 11 as a building base on which the object 2 is built. However, the object 2 can also be built on the base plate 11 itself, which then serves as a building base. In FIG. 1, the object 2 to be formed in the building container 5 on the building platform 12 is shown below the working plane 7 in an intermediate state with several solidified layers, surrounded by unsolidified building material 13.

The building container 5 can be designed as an interchangeable container which can be removed from the device 1 for producing a three-dimensional object and can be used as a post-treatment container in a post-treatment device to be described further below.

The laser sintering device 1 further comprises a storage container 14 for a building material in powder form 15 that can be solidified by electromagnetic radiation and a recoater 16 that can be moved in a horizontal direction H for applying the building material 15 within the build area 8. Preferably, the recoater 16 extends transversely to its direction of movement over the entire area to be coated.

Optionally, a radiant heater 17 is arranged in the processing chamber 3 that serves for preheating the applied building material 15. For example, an infrared heater can be provided as a radiant heater 17.

The laser sintering device 1 further comprises an irradiation device 20 with a laser 21 which produces a laser beam 22 which is deflected by a deflection device 23 and focused upon the working plane 7 by way of a focusing device 24 through a coupling window 25 that is arranged on the upper side of the processing chamber 3 in the chamber wall 4.

Furthermore, the laser sintering device 1 comprises a control unit 29 by which the individual components of the device 1 can be controlled in a coordinated manner in order to implement the method for producing a three-dimensional object 2. The control unit 29 can also be arranged partially or completely outside the device 1. The control unit 29 can comprise a CPU, the operation of which is controlled by a computer program (software). The computer program can be stored separately from the device 1 on a storage medium from which it can be loaded into the device 1, in particular into the control unit 29.

During operation, in order to apply a layer of the building material in powder form (powder layer), the support 10 is first lowered by an amount that corresponds to the desired layer thickness. The recoater 16 first moves to the storage container 14 and therefrom receives a quantity of the building material 15 sufficient for applying at least one layer. The recoater 16 then moves over the build area 8 and there applies a thin layer of the building material 15 in powder form to the building base or a powder layer already present. Application takes place at least over the entire cross-section of the object 2 to be produced, preferably over the entire build area 8, i.e. the area of the working plane 7 that is confined by the container wall 6. Optionally, the building material 15 in powder form is preheated by a radiant heater 17 to a working temperature.

Then, the cross-section of the object 2 to be produced is scanned by the laser beam 22 so that the building material 15 in powder form is solidified at those locations that correspond to the cross-section of the object 2 to be produced. By doing so, the powder particles are melted partially or completely at those locations by means of the energy introduced by the radiation so that they are present joint together as a solid body after cooling.

These steps are repeated until the object 2 is completed.

Subsequently, the three-dimensional object 2 produced and/or the unsolidified buildup material 13, in which the three-dimensional object is embedded, are post-treated. Post-treatment preferably takes place outside the processing chamber 3. This allows the processing chamber to be available for the production of another three-dimensional object during post-treatment.

Figure 2:
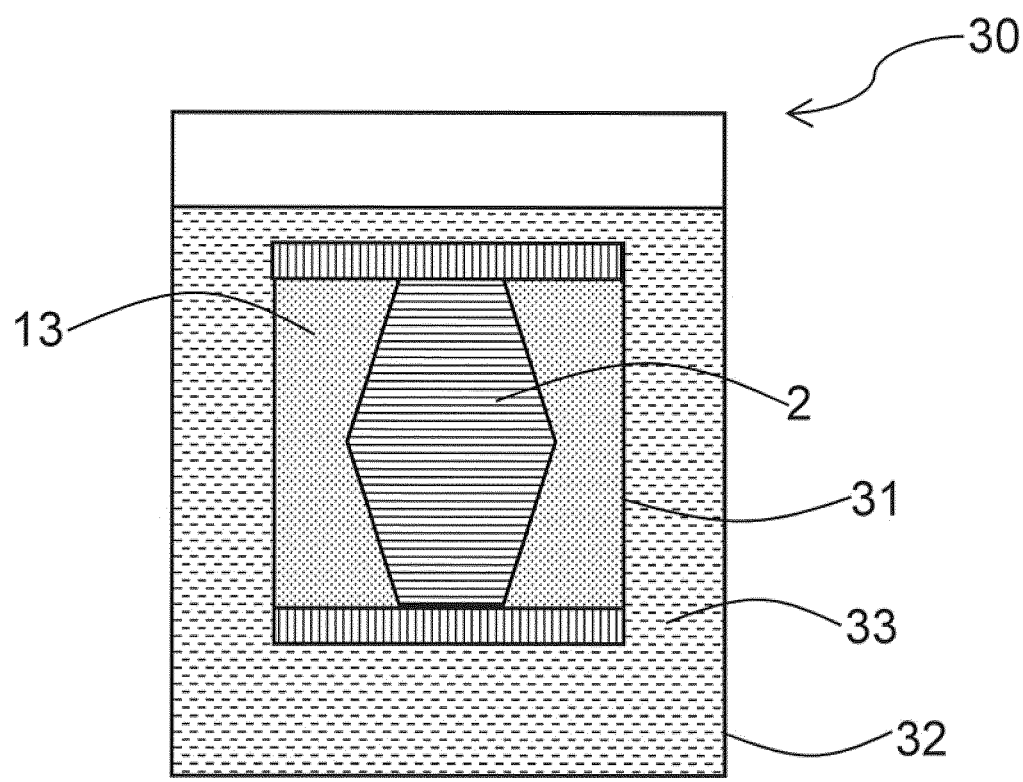
FIG. 2 shows a schematic view, partially in cross-section, of a post-treatment device for a post-treatment system according to an exemplary embodiment of the present invention.

FIG. 2 schematically shows a post-treatment device 30 as part of a post-treatment system according to an exemplary embodiment of the present invention. Other components of the inventive post-treatment system are not shown in FIG. 2 for reasons of clarity—concerning this, it is referred to the previous description with corresponding examples. The post-treatment device 30 comprises a post-treatment container 31 that is intended to receive in its interior the three-dimensional object 2 and the unsolidified building material 13 in which the three-dimensional object 2 is embedded.

The post-treatment device 30 further comprises a container 32 for a liquid, which container is open to the top and can be filled with a liquid 33 and which is designed such that it can at least partially accommodate the post-treatment container 31 in its interior so that the post-treatment container 31 can at least partially be immersed in the liquid 33 with which the container 32 for the liquid is filled.

According to an exemplary embodiment, the post-treatment container 31 is the building container 5 which can be removed from the laser sintering device 1 as an interchangeable container and can be immersed in the container 32 for the liquid. The building container 5 may be provided with a lid that is permeable to liquid.

Alternatively, the post-treatment container 31 can have a bottom that is at least partially fluid-permeable (i.e. permeable to a fluid, i.e. a gas and/or a liquid) and/or a lid that is at least partially fluid-permeable. Alternatively or additionally, the post-treatment container 31 can be configured to be at least partially fluid-permeable in the region of its sidewall.

In the operating state shown in FIG. 2, the post-treatment container 31 is located inside the container 32 for the liquid. In this state, the post-treatment container 31 is immersed in the liquid 33. Part of the liquid 33 is inside the post-treatment container 31.

In an exemplary embodiment of the post-treating method, the three-dimensional object 2 and the unsolidified building material 13 surrounding the three-dimensional object 2 are post-treated in the post-treatment device 30 according to the exemplary embodiment schematically shown in FIG. 2 and described above. For this purpose, the post-treatment container 31 is immersed in the liquid 33 that is located in the container 32 for the liquid.

When the post-treatment container 31 is immersed in the liquid 33, liquid 33 penetrates into the interior of the post-treatment container 31 and there comes into contact with the three-dimensional object 2 and/or the unsolidified building material 13, i.e. the three-dimensional object 2 and/or the unsolidified building material 13 are treated with the liquid 33. In doing so, it is preferred that the liquid 33 completely penetrates the powder bed formed by the unsolidified building material 13, so that all areas of the powder bed come into contact with the liquid 33 and no dry areas remain. It is furthermore preferred that the liquid 33 substantially wets the unsolidified building material entirely.

When the post-treatment container 31 is immersed in the liquid 33, a force can be exerted on the post-treatment container 31 that is opposed to the buoyancy force of the liquid 33.

The liquid used for treating the three-dimensional object and/or of unsolidified building material 13 comprises a liquid carrier substance and at least one further substance that reduces the surface tension of the carrier substance.

The carrier substance and the at least one further substance are selected, among other things, with regard to the compatibility of these substances with each other and with the building material in powder form. Preferably, the carrier substance and the further substance are matched to one another in such a way that, after potentially drying of the three-dimensional object 2 and/or of the unsolidified building material 13, no residues remain on the three-dimensional object 2 and/or the unsolidified building material, which residues lead to an incompatible material combination and/or contamination with regard to further use. In particular, a substance that has been used in the preparation of the building material in powder form is used as the further substance. For example, PA12 in powder form is produced with the aid of ethanol. Thus, in the case of a building material in powder form that contains PA12, the choice of ethanol as a further substance has proved to be convenient, in particular if water is used as the carrier substance.

The concentration of the further substance in the liquid is chosen, among other things, with regard to the fact that the surface tension of the carrier substance is reduced in such a way that the wetting of the unsolidified and/or the solidified building material is improved. For example, a concentration of at least 0.1 percent by weight, preferably at least 0.5 percent by weight, more preferably at least 1 percent by weight, even more preferably at least 2.5 percent by weight, most preferably at least 5 percent by weight has proved to be suitable. Furthermore, for example, a concentration of 45 percent by weight at most, preferably 35 percent by weight at most, more preferably 25 percent by weight at most, even more preferably 15 percent by weight at most, most preferably 10 percent by weight at most has proved to be suitable.

A concentration of at least 65 percent by weight, preferably at least 75 percent by weight, more preferably at least 85 percent by weight, particularly preferred at least 90 percent by weight has proven to be a suitable concentration of the carrier substance in the liquid, for example. Furthermore, a concentration of 99.5 percent by weight at most, preferably 99 percent by weight at most, more preferably 97.5 percent by weight at most, particularly preferred 95 percent by weight at most has proven to be a suitable concentration of the carrier substance in the liquid, for example.

The liquid with which the three-dimensional object 2 and/or the unsolidified building material 13 are treated can also comprise several further substances in addition to the carrier substance.

In an exemplary embodiment of the method for post-treating, water is used as the carrier substance. Purified water can be used to avoid contamination of the three-dimensional object 2 and/or the unsolidified building material 13 by substances contained in spring water or water from the tap in addition to $H_2O$ (e.g. lime). Purified water can be distilled or deionized or demineralized water or ultrapure water, for example.

In this embodiment, the liquid with which the three-dimensional object 2 produced and/or the unsolidified building material 13 are treated contains ethanol as the further substance. The addition of ethanol reduces the surface tension of the carrier substance water. Thus, wetting of the unsolidified and/or solidified building material with the carrier substance is improved.

In a concrete example, the ethanol concentration of the aqueous ethanol solution used as liquid 33 for post-treating of a three-dimensional object 2 and unsolidified building material 13 is 5 percent by weight. For the production of the three-dimensional object 2, a building material in powder form 15 containing PA12 was used, wherein in particular ethanol had been used for the preparation of PA12. The liquid 33 penetrates the unsolidified building material 13 even if it forms a highly compressed powder bed.

As an alternative or in addition to ethanol, the liquid can also contain at least one substance other than ethanol as the further substance, which substance reduces the surface tension of the carrier substance. For example, the at least one substance other than ethanol can be an organic compound, for example a compound selected from the group consisting of the following compounds: acyclic and cyclic aliphatic hydrocarbons, which can be, respectively, alkanes, alkenes and alkynes, aromatic hydrocarbons, halogenated hydrocarbons, alcohols (in particular acyclic alcohols such as methanol, n-propanol, isopropanol, n-butanol, iso-butanol, sec-butanol, tert-butanol), ketones, aldehydes, carboxylic acids, ethers and esters. The substance other than ethanol can also be a surfactant, such as sodium dodecyl sulphate. The use of volatile compounds, in particular volatile organic compounds, has proven to be advantageous, as these can be removed from the three-dimensional object 2 and the unsolidified building material 13 in a simple way and without leaving residues by means of evaporation.

In an exemplary embodiment of the method for post-treating, before post-treatment the liquid 33 has a temperature lower than the temperature of the three-dimensional object 2 produced, so that the three-dimensional object 2 is cooled during post-treatment. For example, the three-dimensional object 2 and/or the unsolidified building material are cooled to a temperature which substantially corresponds to the room temperature. In order to reduce the occurrence of aging effects in the unsolidified building material 13, at least part of the unsolidified building material 13 can be cooled to a temperature below the glass transition temperature of a polymer contained in the building material during post-treatment. In order to minimize or prevent deformations of the three-dimensional object 2 that occur during cooling, the entire three-dimensional object, i.e. including its interior, can be cooled to a temperature below the glass transition temperature of a polymer contained in the building material.

In an exemplary embodiment of the method for post-treating, treatment of the three-dimensional object 2 and/or the unsolidified building material 13 with a liquid 33 is implemented in that the three-dimensional object 2 and/or the unsolidified building material 13, together with the liquid 33, are introduced into a post-treatment container designed as a drum, for example, and the post-treatment container executes a rotational movement in order to establish intimate contact between the liquid and the three-dimensional object 2 and/or the unsolidified building material.

In a further exemplary embodiment, the liquid is brought into contact with the three-dimensional object 2 and/or the unsolidified building material 13 in the form of one or more jets directed at the three-dimensional object 2 and/or the unsolidified building material 13 in order to treat the three-dimensional object and/or the unsolidified building material 13.

In a further exemplary embodiment, a container, inside which the three-dimensional object 2 and/or the unsolidified building material 13 are located, is at least partially filled with the liquid by introducing the liquid in order to treat the three-dimensional object 2 and/or the unsolidified building material 13.

In a further exemplary embodiment, the liquid is transported through a container inside which the three-dimensional object and/or the unsolidified building material 13 are located. By doing so, the liquid can, for example, be circulated by means of a pump, wherein a station for treatment and/or cleaning the liquid may be arranged in the circuit.

In a further exemplary embodiment, post-treatment is implemented by at least two post-treatment steps carried out one after the other, wherein at least one post-treatment step is carried out with the aid of a further liquid. For example, the further liquid can be a mixture of several substances, in particular a solution, or a mono-constituent substance such as water. The liquids used in different post-treatment steps can differ, for example, with regard to their compositions and/or their temperatures. Thus it is possible that the three-dimensional object 2 and/or the unsolidified building material 13 are treated in one of the post-treatment steps with a liquid which has a different concentration of the further substance than the liquid used in a preceding post-treatment step. For example, in order to accelerate drying by evaporation, the three-dimensional object and/or the unsolidified building material can be treated in a second post-treatment step with a liquid which is more volatile and/or has a higher content of the more volatile component than the liquid used in the first post-treatment step.

In a further exemplary embodiment, post-treatment is implemented by at least two post-treatment steps carried out one after the other, wherein at least one post-treatment step comprises waiting for a predetermined resting term. Thus it is possible, for example, to cool the produced three-dimensional object in a first post-treatment step to a temperature starting from which, in the course of a subsequent post-treatment step with a liquid, it is cooled in such a way that cracks and/or deformations do not form in the three-dimensional object.

In a further exemplary embodiment, post-treatment is implemented by at least two post-treatment steps carried out one after the other so that after the first one of the post-treatment steps, at least a part of the unsolidified building material has a temperature below the glass transition temperature of a polymer contained in the building material. This way, for example, aging effects of the unsolidified building material can be minimized or avoided completely.

Mechanical forces can be used to separate the three-dimensional object 2 produced and unsolidified building material 13 that is slurried by treatment with the liquid. In particular, separation takes place after and/or in combination with treatment with the liquid 33.

In a further exemplary embodiment of the method for post-treating, one or more jets of the liquid are used to remove unsolidified building material 13 from the three-dimensional object 2, in particular to rinse unsolidified building material out of channels and/or cavities of the three-dimensional object 2.

Alternatively or additionally, the three-dimensional object and/or the unsolidified building material and/or the liquid 33 can be set in motion in order to facilitate separation. For example, the movement can be a vibrating movement and/or a shaking movement and/or a swiveling movement and/or a stirring movement.

For example, the post-treatment device 30 can comprise a vibrating plate on which the post-treatment container is arranged in order to generate a vibrating movement.

Alternatively or additionally, the post-treatment device 30 can comprise a gripper that grips the post-treatment container and/or the three-dimensional object 2 and sets it in motion, e.g. by swinging it back and forth.

Alternatively or additionally, the post-treatment device 30 can comprise a stirring device to generate a stirring movement. For example, a magnetic stirrer can be used as stirring device.

In a further exemplary embodiment of the method for post-treating, the three-dimensional object 2 and/or the unsolidified building material 13 are treated with pressure waves, preferably with acoustic waves or sound waves, in particular with ultrasound and/or infrasound, in order to facilitate separation of the unsolidified building material 13 from the three-dimensional object 2.

For example, the post-treatment device can comprise one or more ultrasonic transducers to generate ultrasound. For example, the ultrasonic transducer can be arranged on the wall of the post-treatment container. Alternatively or additionally, it is also possible to immerse the post-treatment container at least partially in an ultrasonic bath equipped with an ultrasonic transducer.

Alternatively or additionally, the post-treatment device can comprise one or more infrasound generators to generate infrasound.

After treating the three-dimensional object 2 and/or the unsolidified building material 13, drying of the three-dimensional object 2 and/or the unsolidified building material 13 can be performed. Drying can be implemented, for example, by evaporating the liquid. To accelerate drying, the drying can be carried out at elevated temperature and/or reduced pressure. For example, evaporation can be carried out in a condensation dryer, a vacuum dryer or low-pressure dryer or a rotary evaporator. To accelerate drying of the unsolidified building material, it can also be distributed or spread so that a larger accessible surface is available, allowing the liquid to evaporate more quickly. The three-dimensional objects can be dried either packed or stacked. In order to accelerate the drying of the parts, they can be stored isolated or separated, i.e. they can be flushed by air or gas substantially without any obstruction, so that as small a surface as possible is in contact with other surfaces, e.g. contact surfaces or support surfaces of a support device.

Drying can also be implemented with the aid of a gas stream that flows towards or through the three-dimensional object 2 and/or the unsolidified building material 13. The gas flow is preferably composed of a protective or inert gas, in particular nitrogen, or air, in particular dry air. The gas flow is preferably formed from a heated gas whose temperature is in particular selected to be higher than the present temperature of the object 2 or the unsolidified building material 13 and/or lower than the temperature which would lead to aging phenomena in the object 2 or the unsolidified building material 13. Aging phenomena are understood to be thermally induced effects of the building material inside or outside the object, which substantially occur only beyond a material-dependent threshold temperature. In other word, the temperature of the heated gas should preferably be below said material-dependent threshold temperature.

For example, convective heaters (e.g. a convective oven), radiant heaters (e.g. an IR radiator), contact heaters (e.g. a heating plate) or other heaters can be used to heat the three-dimensional object 2 and/or the unsolidified building material.

If drying takes place at an elevated temperature, the temperature is selected so that in the three-dimensional object 2 and/or the unsolidified building material 13 substantially no degradation effects occur as a result of the elevated temperature. When using a building material 15 containing PA12, an elevated temperature compared to room temperature, which elevated temperature does not exceed 80° C., has proved to be suitable.

Drying, in particular drying of the unsolidified building material 13, by means of a centrifuge is also possible. Centrifugation is consequently also understood as drying in the context of the invention.

If applicable, the above methods for drying can be combined as desired.

In order to at least partially recover the liquid and/or the carrier substance and/or the at least one further substance, the liquid separated from the three-dimensional object 2 and/or the unsolidified building material 13 can be collected, possibly after condensation of vapors produced by evaporation of the liquid.

Before reuse, regeneration and/or purification of the recovered liquid or carrier substance and/or at least one further recovered substance can be carried out. The recovered liquid may be purified, for example, by sieving, centrifugation, filtering, evaporating the more volatile component, distillation or by means of a hydrocyclone.

The features of the exemplary embodiments described above can be combined and modified as far as applicable.

Although the production of a three-dimensional object was described above by means of laser sintering or laser melting, the invention is not restricted to post-treatment of a three-dimensional object produced by laser sintering or laser melting and of unsolidified building material in which such a three-dimensional object is embedded after its production. The invention can be applied to post-treatment of three-dimensional objects which have been produced by any additive manufacturing process and respective building materials.

The irradiation device can, for example, comprise one or more gas or solid state laser or any other kind of laser, such as laser diodes, in particular VCSEL (Vertical Cavity Surface Emitting Laser) or VECSEL (Vertical External Cavity Surface Emitting Laser) or an array of these lasers. In general, any device can be used as irradiation device with which energy as wave or particle radiation can be selectively applied to a layer of the building material. Instead of a laser, for example another light source, an electron beam or any other source of energy or of radiation suited to solidify the building material may be used. Instead of deflecting a beam, also irradiation by a movable array light source can be applied. The invention can also be applied to selective mask sintering, wherein an extended light source and a mask are used, or high speed sintering (HSS), wherein a material is selectively applied to the building material that increases (absorption sintering) or reduces (inhibition sintering) absorption of radiation at the respective locations and then the building material is irradiated non-selectively over a wide area or with a movable array light source.

Various materials can be used as building material in powder form, preferably plastic powders, metal powders, ceramic powders, sand, filled or mixed powders. The building material in powder form can, for example, comprise at least one of the polymers from the following group of polymers: polyetherimides, polycarbonates, polyphenylene sulfones, polyphenylene oxides, polyethersulfones, acrylonitrile-butadiene-styrene copolymers, polyacrylates, polyesters, polyamides, polyaryletherketones, polyethers, polyurethanes, polyimides, polyamide-imides, polyolefins and copolymers comprising at least two different monomer units of the aforementioned polymers. Additionally or alternatively, the building material in powder form comprise at least one polyblend based on at least two of the aforementioned polymers and copolymers.

Figure 3:
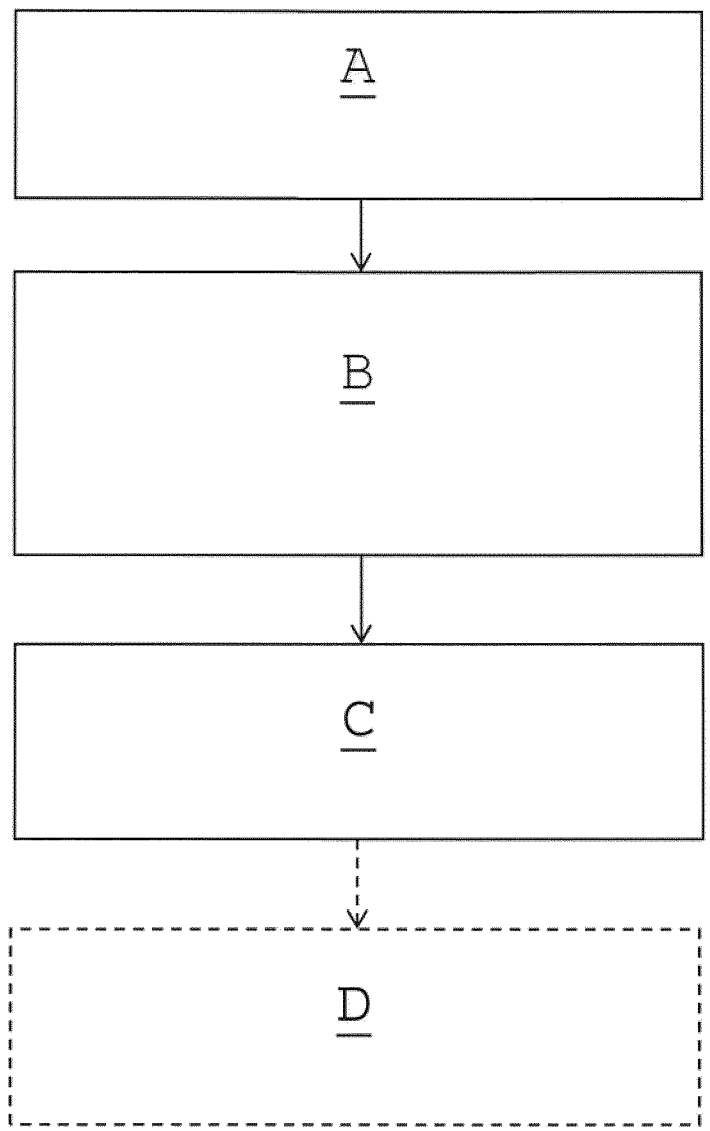
FIG. 3 shows a schematic procedural block diagram of an exemplary embodiment of the method according to the invention within the overall scope of the production of a three-dimensional object.

FIG. 3 schematically shows the steps of a method according to the invention. In a first step A (a pre-step to the actual method according to the invention), a three-dimensional object 2 is produced by means of selectively solidifying, layer by layer, of a building material in powder form 15. In a second step B, a liquid 33 is provided which contains a liquid carrier substance and at least one further substance which reduces the surface tension of the carrier substance. With this liquid, in a step C (the method according to the invention), the three-dimensional object 2 and/or the unsolidified building material 13 is post-treated by the liquid. In an optional step D, the three-dimensional object 2 and/or the unsolidified building material 13 is dried.

The invention claimed is:

1. A method for post-treating unsolidified building material, comprising:
producing a three-dimensional object by selectively solidifying, layer by layer, a building material in powder form such that the three-dimensional object is embedded in the unsolidified building material;
treating the unsolidified building material with a liquid; and
drying the unsolidified building material after the unsolidified building material has been treated with the liquid,
wherein the liquid comprises a liquid carrier substance and at least one further substance that reduces surface tension of the carrier substance; and
wherein the carrier substance and the at least one further substance are matched to one another such that, after drying the unsolidified building material, no residues remain on the unsolidified building material, which residues lead to an incompatible material combination and/or contamination with regard to further use.

2. The method according to claim 1, wherein the at least one further substance is more volatile than the carrier substance.

3. The method according to claim 1, wherein the at least one further substance is an alcohol.

4. The method according to claim 1, wherein:
a concentration of the at least one further substance in the liquid is at least 0.1 percent by weight; and/or
the concentration of the at least one further substance in the liquid is at most 45 percent by weight.

5. The method according to claim 1, wherein:
the liquid carrier substance includes water; and
a concentration of the water in the liquid is at least 65 percent by weight and/or the concentration of the water in the liquid is 99.5 percent by weight at most.

6. The method according to claim 1, wherein the building material in powder form comprises at least one of:
a polymer comprising at least one of polyetherimides, polycarbonates, polyphenylene sulfones, polyphenylene oxides, polyethersulfones, acrylonitrile-butadiene-styrene copolymers, polyacrylates, polyesters, polyamides, polyaryletherketones, polyethers, polyurethanes, polyimides, polyamide-imides, or polyolefins;
a copolymer comprising at least two different monomer units of the polymers; or
a polyblend based on at least two of the copolymers and/or polymers.

7. The method according to claim 6, wherein the at least one further substance is a substance used for preparing the building material in powder form.

8. The method according to claim 6, wherein the building material in powder form comprises a polyamide.

9. The method according to claim 8, wherein the building material in powder form comprises a PA12.

10. The method according to claim 1, wherein the step of treating with the liquid is carried out by at least partially immersing:
    the unsolidified building material in the liquid; or
    the three-dimensional object and the unsolidified building material in the liquid.

11. The method according to claim 10, wherein:
    a force is exerted on the unsolidified building material or both the three-dimensional object and the unsolidified building material; and
    the force is opposed to the buoyancy force acting on one or both of the three-dimensional object or the unsolidified building material.

12. The method according to claim 1, wherein the unsolidified building material is located in channels and/or cavities of the three-dimensional object, and the method further comprises:
    detaching the unsolidified building material from the channels and/or the cavities of the three-dimensional object;
    treating one or both of the unsolidified building material located in the channels and/or the cavities of the three-dimensional object or the three-dimensional object with one or more of ultrasound, infrasound, and a jet of the liquid; and/or
    agitating the liquid by one or more of shaking, stirring, or swiveling.

13. The method according to claim 1, wherein the step of drying comprises:
    drying at least a part of the unsolidified building material by one or more of a centrifuge, a gas flow, or a heating; or
    drying the three-dimensional object and at least a part of the unsolidified building material by one or more of the centrifuge, the gas flow, or the heating.

14. The method according to claim 1, wherein:
    the post-treatment is implemented by at least two post-treatment steps carried out one after the other; and
    at least one post-treatment step is implemented by a further liquid.

15. The method according to claim 1, wherein:
    the post-treatment is implemented by at least two post-treatment steps carried out one after the other; and
    at least one post-treatment step comprises waiting for a predetermined resting term.

16. The method according to claim 1, wherein the liquid is cleared from unsolidified building material by sedimentation and/or filtration.

17. The method according to claim 1, further comprising post-treating the three-dimensional object.

18. The method according to claim 17, wherein the three-dimensional object is treated with the liquid.

19. A method for post-treating unsolidified building material, comprising:
    producing a first three-dimensional object by selectively solidifying, layer by layer, a building material in powder form such that the first three-dimensional object is embedded in the unsolidified building material;
    selecting a liquid that includes a liquid carrier substance and at least one further substance that reduces a surface tension of the carrier substance, the selecting being performed so as to reduce a surface tension of the liquid on the unsolidified building material when the unsolidified building material is cooled with the liquid;
    cooling the unsolidified building material with the liquid;
    drying the unsolidified building material after the unsolidified building material has been cooled with the liquid so as to produce a treated unsolidified building material; and
    producing a second three-dimensional object by selectively solidifying, layer by layer, the treated unsolidified building material.

* * * * *